United States Patent
Han et al.

(10) Patent No.: US 11,833,466 B2
(45) Date of Patent: *Dec. 5, 2023

(54) PURIFICATION DEVICE FOR PURIFYING AIR AND AIR PURIFIER HAVING SAME

(71) Applicants: Guangdong Midea White Home Appliance Technology Innovation Center Co., Ltd., Foshan (CN); Midea Group Co., Ltd., Foshan (CN)

(72) Inventors: Yunqing Han, Foshan (CN); Chubin Ou, Foshan (CN); Tongsheng Wang, Foshan (CN); Hui Zhang, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 495 days.

This patent is subject to a terminal disclaimer.

(21) Appl. No.: 17/160,269

(22) Filed: Jan. 27, 2021

(65) Prior Publication Data

US 2021/0146294 A1    May 20, 2021

Related U.S. Application Data

(63) Continuation of application No. PCT/CN2018/122335, filed on Dec. 20, 2018.

(30) Foreign Application Priority Data

Aug. 31, 2018   (CN) .......................... 201811013337.0

(51) Int. Cl.
*B01D 45/14*    (2006.01)
*B01D 47/16*    (2006.01)
(Continued)

(52) U.S. Cl.
CPC .............. *B01D 47/16* (2013.01); *B01D 45/14* (2013.01); *B01D 46/0005* (2013.01);
(Continued)

(58) Field of Classification Search
CPC ......... B01D 47/00; B01D 47/06; B01D 47/16
See application file for complete search history.

(56) References Cited

U.S. PATENT DOCUMENTS 8,313,569 B2    11/2012  Park et al.
2006/0102001 A1  5/2006  Shin
(Continued)

FOREIGN PATENT DOCUMENTS

CN       101056689 A    10/2007
CN       101072618 A    11/2007
(Continued)

OTHER PUBLICATIONS

Guangdong Midea White Home Appliance Technology Innovation Center Co., Ltd., et al., Extended European Search Report, EP 18932172.2, dated Jun. 23, 2021, 7 pgs.
(Continued)

*Primary Examiner* — Robert A Hopkins
(74) *Attorney, Agent, or Firm* — Morgan, Lewis & Bockius LLP

(57) ABSTRACT

The method and system disclosed herein present a purification device for purifying air, and an air purifier having the same. The purification device for purifying air comprises a housing, one or more purification assemblies, one or more water inlet pipes, one or more capture assemblies, and an electric motor. The housing is provided with an air inlet and an air outlet. A cavity, in communication with the air inlet and the air outlet, is defined inside the housing. Each of the one or more purification assemblies is rotatably arranged in the cavity, and is located between the air inlet and the air
(Continued)

outlet. Each of the one or more capture assemblies is rotatably arranged at a downstream side of the one or more purification assemblies. The electric motor is used for driving the one or more purification assemblies and the one or more capture assemblies.

20 Claims, 6 Drawing Sheets

(51) Int. Cl.
      *B01D 46/00*               (2022.01)
      *B01D 46/10*               (2006.01)
      *B01D 46/26*               (2006.01)
      *B01D 47/06*               (2006.01)

(52) U.S. Cl.
     CPC ............ *B01D 46/10* (2013.01); *B01D 46/26* (2013.01); *B01D 47/06* (2013.01); *B01D 2259/4508* (2013.01)

(56) References Cited

U.S. PATENT DOCUMENTS

| | | |
|---|---|---|
| 2011/0155117 A1 | 6/2011 | Kim et al. |
| 2016/0010881 A1 | 1/2016 | Moon et al. |
| 2017/0122587 A1 | 5/2017 | Son et al. |

FOREIGN PATENT DOCUMENTS

| | | | |
|---|---|---|---|
| CN | 201015721 Y | | 2/2008 |
| CN | 201108754 Y | | 9/2008 |
| CN | 201132076 Y | | 10/2008 |
| CN | 202173801 U | | 3/2012 |
| CN | 104436939 A | | 3/2015 |
| CN | 204219955 U | | 3/2015 |
| CN | 1044369393 A | | 3/2015 |
| CN | 104524905 A | | 4/2015 |
| CN | 104606965 A | | 5/2015 |
| CN | 204469452 U | * | 7/2015 |
| CN | 204543859 U | | 8/2015 |
| CN | 105817099 A | | 8/2016 |
| CN | 105999932 A | | 10/2016 |
| CN | 205730716 U | | 11/2016 |
| CN | 106422624 A | | 2/2017 |
| CN | 106512565 A | | 3/2017 |
| CN | 206121405 U | | 4/2017 |
| CN | 107648961 A | | 2/2018 |
| CN | 207661867 U | | 7/2018 |
| CN | 108434904 A | | 8/2018 |
| CN | 208799912 U | | 4/2019 |
| GB | 2169816 A | | 7/1986 |
| JP | 2009066389 A | | 4/2009 |
| JP | 2019058256 A | | 4/2019 |
| KR | 100818365 B1 | | 4/2008 |
| WO | WO 2007094727 A1 | | 8/2007 |
| WO | WO 2010/090369 A1 | | 8/2010 |
| WO | WO 2013141549 A1 | | 9/2013 |

OTHER PUBLICATIONS

Guangdong Midea White Home Appliance Technology Innovation Center Co., Ltd., et al., Communication pursuant to rules 70 (2) and 70a (2) EPC, EP 18932172.2, dated Jul. 13, 2021, 1 pg.
Midea Group Co., Ltd., Written Opinion, PCT/CN2018/122335, dated May 20, 2019, 6 pgs.
International Search Report and Written Opinion, PCT/CN2018/122335, dated May 20, 2019, 11 pgs.
Guangdong Midea White Household Appliance Technology Innovation Center Co. Ltd., First Office Action, CN201811013337.0, dated Jul. 3, 2020, 8 pgs.
Midea Group Co., Ltd., Iprp, PCT/CN2018/122335, Mar. 2, 2021, 7 pgs.
Midea Group Co., Ltd., First JP Office Action, JP Patent Application No. 2021-522119, dated Mar. 2, 2022, 2 pgs.
Midea Group Co., Ltd., Chinese Office Action, CN Patent Application No. 201811013328.1, dated Jul. 22, 2020, 19 pgs.
Midea Group Co., Ltd., Chinese Office Action, CN Patent Application No. 201811013328.1, dated Mar. 12, 2021, 15 pgs.
Midea Group Co., Ltd., Chinese Office Action, CN Patent Application No. 201811013328.1, dated Jun. 18, 2021, 18 pgs.
Midea Group Co., Ltd., Chinese Office Action, CN Patent Application No. 201811013328.1, dated Sep. 22, 2021, 11 pgs.
Midea Group Co., Ltd., Extended European Search Report, EP18931891.8, dated Sep. 24, 2021, 7 pgs.
Midea Group Co., Ltd., ISRWO, PCT/CN2018/122119, May 24, 2019, 7 pgs.
Midea Group Co., Ltd., IPRP, PCT/CN2018/122119, dated Mar. 2, 2021, 5 pgs.
Midea Group Co., Ltd., Japanese Office Action, JP Patent Application No. 2021-522118 dated Mar. 8, 2022, 6 pgs.
Midea Group Co., Ltd., U.S. Notice of Allowance, U.S. Appl. No. 17/160,276, dated Feb. 22, 2022, 16 pgs.

* cited by examiner

PURIFICATION DEVICE FOR PURIFYING AIR AND AIR PURIFIER HAVING SAME

CROSS-REFERENCE TO RELATED APPLICATION

This application is a continuation of PCT International Application No. PCT/CN2018/122335, filed Dec. 20, 2018, which claims priority to Chinese Patent Application No. 201811013337.0, filed on Aug. 31, 2018, each of which are hereby incorporated by reference in its entirety.

TECHNICAL FIELD

The disclosure relates to the field of domestic appliances, and particularly relates to a purification device for purifying air, and an air purifier provided with the same.

BACKGROUND

An air purifier is configured to purify air to improve the air quality. Most air purifiers in the related art use purification devices to directly purify air. For example, a purification net or an adsorption device can purify and adsorb dust in the air, but the structure is complicated, and the purification effect is poor.

SUMMARY

The disclosure aims to solve at least one of the technical problems in the related art.

Therefore, one objective of the disclosure is to provide a purification device for purifying air. The purification device is simple in structure, good in purification effect, and small in pressure loss.

The disclosure further provides an air purifier provided with the purification device for purifying air.

A purification device for purifying air according to an embodiment of the first aspect of the disclosure includes a housing, at least one purifying assembly, at least one water inlet pipe, at least one capture member, and a motor. The housing is provided with an air inlet and an air outlet, and a cavity communicating with the air inlet and the air outlet is defined in the housing. The purifying assembly is rotatably arranged in the cavity and located between the air inlet and the air outlet. The purifying assembly includes a first rotary cylinder and a first rotary disk. The first rotary cylinder is spaced apart from a side wall of the housing. A side wall of the first rotary cylinder is provided with a first mesh in the circumferential direction of the side wall of the first rotary cylinder. The first rotary disk is connected downstream of the first rotary cylinder. A portion of the first rotary disk, which is located between the first rotary cylinder and the housing in a radial direction, is provided with a second mesh. The water inlet pipe includes a water inflow end and a water discharge end. The water discharge end is provided with a plurality of circumferentially distributed water injection nozzles, and the water discharge end extends into the first rotary cylinder. The capture member is rotatably arranged on downstream of the purifying assembly. The capture member includes a second rotary cylinder and a second rotary disk. An outer circumferential wall of the second rotary cylinder is a cylindrical surface, and the second rotary cylinder is spaced apart from the side wall of the housing. The second rotary disk is arranged downstream of the second rotary cylinder. A portion of the second rotary disk, which is located between the second rotary cylinder and the housing at least in the radial direction, is provided with a third mesh. The motor is configured to drive the purifying assembly and the capture member into rotation.

The purification device for purifying air according to the embodiments of the disclosure may realize high-efficiency purification of air, and is simple in structure, good in purification effect and small in pressure loss.

In addition, the purification device for purifying air according to the disclosure may also have the following additional technical features.

In some embodiments of the disclosure, the motor is arranged above the capture member to drive the purifying assembly and the capture member to rotate synchronously.

In some embodiments of the disclosure, the water inflow end of the water inlet pipe is located at a lower part of the housing, and the water discharge end is arranged at a position higher than the water inflow end.

In some embodiments of the disclosure, the first rotary disk is in the form of an annular disk, and an inner side wall of the annular disk is connected with an outer side wall of the first rotary cylinder.

In some embodiments of the disclosure, the first rotary disk is in the form of a circular disk, the first rotary cylinder is in the form of a hollow structure with an open upper end, and the first rotary disk closes the upper end of the first rotary cylinder.

In some embodiments of the disclosure, each of an upper and a lower end of the first rotary cylinder is formed as a closed structure, and a bottom wall of the first rotary cylinder is provided with an opening adapted to be passed by the water inlet pipe.

In some embodiments of the disclosure, the purification device for purifying air may further include a water pan, wherein the water pan is arranged at a bottom of the housing, and the water inflow end is located in the water pan.

In some embodiments of the disclosure, the housing is in the form of a cylinder, and a radius of the first rotary cylinder is 0.2 to 0.7 times a radius of the housing.

In some examples of the disclosure, an axial height of the first rotary cylinder is 0.1 to 0.8 times the radius of the housing.

In some embodiments of the disclosure, the side wall of the first rotary cylinder is in the form of a wire mesh structure having 20 to 100 meshes.

In some embodiments of the disclosure, a porosity of the side wall of the first rotary cylinder is 0.3 to 0.7.

In some embodiments of the disclosure, the air outlet is arranged at a position higher than the air inlet. The purification device for purifying air includes a plurality of purifying assemblies which are sequentially stacked in an up and down direction. The capture member is arranged at an upper end of an uppermost purifying assembly of the plurality of purifying assemblies.

In some examples of the disclosure, the purification device for purifying air includes a plurality of capture members which are sequentially stacked in the up and down direction. Each of the plurality of capture members is arranged above the plurality of purifying assemblies.

In some embodiments of the disclosure, the air outlet is arranged at a position higher than the air inlet. The purification device for purifying air includes a plurality of purifying assemblies and a plurality of capture members. The plurality of capture members and the plurality of purifying assemblies are stacked onto one another in the up and down direction, and at least one of the plurality of capture members is located at a position closest to the air outlet.

In some embodiments of the disclosure, the water inlet pipe passes through the plurality of purifying assemblies, and the water inlet pipe is provided with water injection nozzles corresponding to the first rotary cylinder of each of the plurality of purifying assemblies.

In some embodiments of the disclosure, the purification device for purifying air includes a plurality of water inlet pipes. The water discharge end of each of the plurality of water inlet pipes extends into the first rotary cylinder of a corresponding purifying assembly of the plurality of purifying assemblies.

The disclosure further provides an air purifier provided with the purification device for purifying air in the above embodiments.

In the air purifier according to the embodiments of the second aspect of the disclosure, by arranging the purification device for purifying air in the above embodiments, the purification effect may be improved, and the air purified by the air purifier is cleaner.

The additional aspects and advantages of the disclosure will be partially given in the following description, and parts will become apparent from the following description, or be understood through the practice of the disclosure.

BRIEF DESCRIPTION OF THE DRAWINGS

The above and/or additional aspects and advantages of the disclosure will become apparent and easy to understand from the description of the embodiments in conjunction with the following drawings, wherein.

LIST OF REFERENCE NUMERALS

Figure 1:
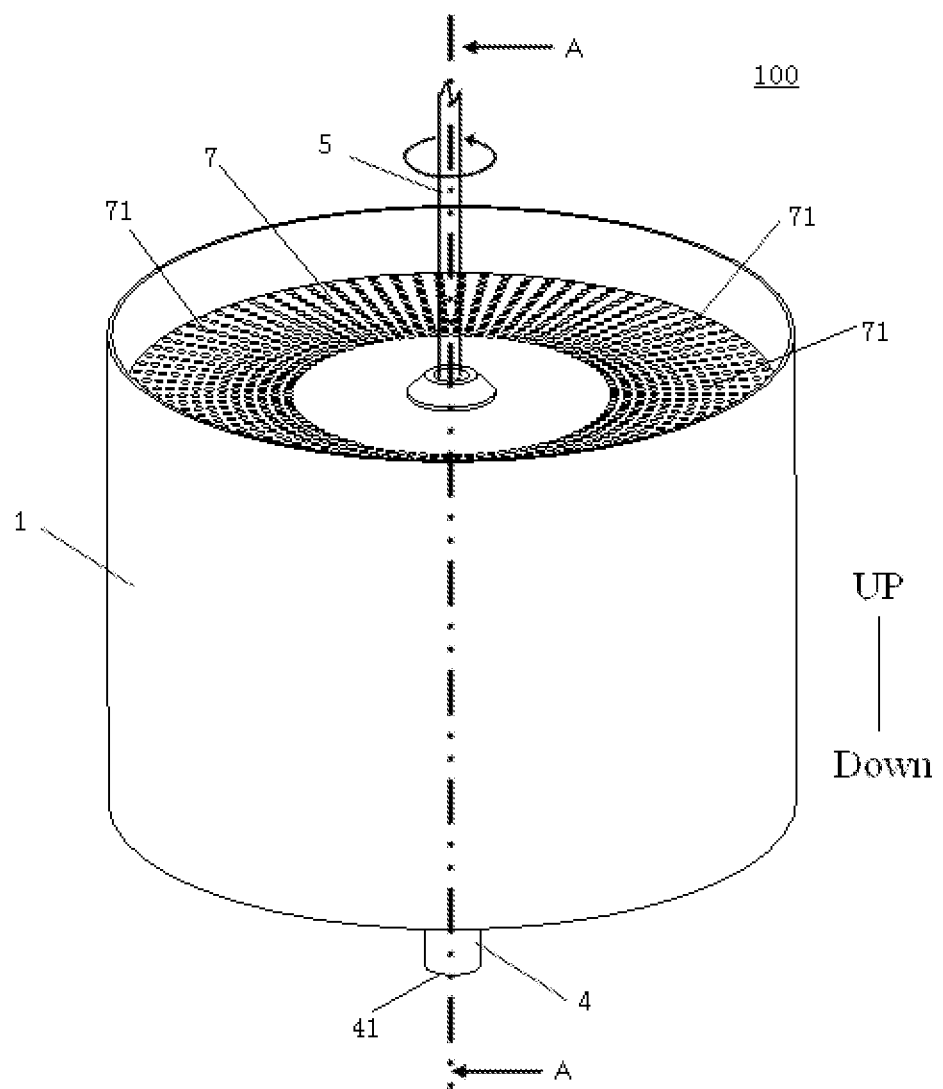
FIG. 1 is a schematic diagram of a purification device for purifying air according to an embodiment of the disclosure.

100: purification device for purifying air;
1: housing; 10: cavity; 11: air inlet; 12: air outlet;
2: first rotary cylinder; 21: first mesh; 22: opening; 23: first interval space;
3: first rotary disk; 31: second mesh;
4: water inlet pipe; 41: water inflow end; 42: water discharge end;
5: motor;
6: second rotary cylinder; 61: second interval space;
7: second rotary disk; 71: third mesh.

DETAILED DESCRIPTION

The embodiments of the disclosure are described in detail below. Examples of the embodiments are shown in the drawings, and the same or similar reference numerals indicate the same or similar components or components having the same or similar functions throughout. The embodiments described below with reference to the drawings are exemplary, and are only intended to explain the disclosure, and should not be construed as limiting the disclosure.

A purification device 100 for purifying air according to the embodiments of the disclosure will be described below with reference to FIG. 1 to FIG. 7.

As shown in FIG. 1 to FIG. 5, the purification device 100 for purifying air according to the embodiments of the disclosure includes a housing 1, at least one purifying assembly, at least one water inlet pipe 4, at least one capture member and a motor 5. The motor 5 is configured to drive the purifying assembly and the capture member into rotation. The housing 1 is provided with an air inlet 11 and an air outlet 12. A cavity 10 communicating with the air inlet 11 and the air outlet 12 is defined in the housing 1. Thus, the air may enter the housing 1 from the air inlet 11, then is purified via the cavity 10 and is discharged from the air outlet 12.

Specifically, the purifying assembly is rotatably arranged in the cavity 10 and located between the air inlet 11 and the air outlet 12. The purifying assembly includes a first rotary cylinder 2 and a first rotary disk 3. The first rotary cylinder 2 is spaced apart from a side wall of the housing 1. In other words, the first rotary cylinder 2 may rotate at a high speed in the cavity 10. The first rotary cylinder 2 is spaced apart from an inner wall surface of the cavity 10 to form a first interval space 23 adapted to be passed by the air. The first rotary cylinder 2 is located between the air inlet 11 and the air outlet 12. Thus, the air entering the air inlet 11 may pass through the first interval space 23. That is, the air may pass through the air inlet 11, the first interval space 23 and the air outlet 12 in sequence in a flowing direction of the air.

A side wall of the first rotary cylinder is provided with a first mesh 21 in a circumferential direction of the side wall of the first rotary cylinder 2. The first rotary disk 3 is connected downstream of the first rotary cylinder 2. As shown in FIG. 2 to FIG. 5, the first rotary disk 3 is rotatably arranged above the first rotary cylinder 2. A portion of the first rotary disk 3, which is located between the first rotary cylinder 2 and the housing 1 in a radial direction, is provided with a second mesh 31. In other words, an outer diameter of the first rotary disk 3 is greater than an outer diameter of the first rotary cylinder 2. A portion of the first rotary disk 3, which corresponds to the first interval space 23 in the axial direction of the first rotary disk 3, is provided with a plurality of second meshes 31. The air may pass through the second meshes 31 to flow downstream.

It should be noted that in the flowing direction of air, a position where the air passes through first is upstream, and a position where the air passes through later is downstream. The upstream and downstream are only used for indicating position relationships. The downstream is a position on a structure where the air passes later. For example, the first rotary disk 3 is connected downstream of the first rotary cylinder 2. That is, in the flowing direction of air, the first rotary disk 3 is arranged on a side of the first rotary cylinder 2 where the air flows later. For example, as shown in FIG. 1, the first rotary disk 3 is arranged on an upper side of the first rotary cylinder 2.

The water inlet pipe 4 includes a water inflow end 41 and a water discharge end 42. The water discharge end 42 is provided with a plurality of circumferentially distributed water injection nozzles. The water discharge end 42 extends into the first rotary cylinder 2. The water inlet pipe 4 is stationary, and the first rotary cylinder 2 rotates at a high speed relative to the water inlet pipe 4, thereby facilitating water delivery. Of course, the disclosure is not limited to this. The water inlet pipe 4 may also rotate around its own axis.

Specifically, the water inflow end 41 of the water inlet pipe 4 communicates with a water source. Water may be injected from the water inlet pipe 4 into the first rotary cylinder 2 by means of the plurality of circumferentially distributed water injection nozzles of the water discharge end 42. The first rotary cylinder 2 rotates at a high speed so that the water injected into the first rotary cylinder 2 is spread into a liquid film on an inner wall of the first rotary cylinder 2. The liquid film passes through the first mesh 21 under the action of a centrifugal force and is torn to be a form of fine water column, water droplet or water mist under the action of a shear force. By tearing the water to be the form of fine water column, water droplet or water mist, a contact area between the water and the air can be enlarged, and full mixing of the water and the air is facilitated, thereby facilitating purification of contamination particles such as dust in the air through the water.

For the convenience of description, the following description mainly takes the water droplets in the fine water column, water droplet or water mist as an example. However, this should not be understood as a limitation of the disclosure.

The water drops enter the first interval space 23, and may be mixed with air flowing through the first interval space 23. Therefore, a part of the water drops can capture the dust particles in the air and do centrifugal motion with the dust particles, and can be thrown to an inner wall surface of the housing 1 to fall off along the inner wall surface. A part of the water drops will continue to flow downstream. The first rotary disk 3 is arranged downstream of the first interval space 23. When the air flows through the first rotary disk 3, residual water in the air contacts the first rotary disk 3. Since the first rotary disk 3 rotates at a high speed, the water drops can be spread into a thin liquid film on the first rotary disk 3 provided with the plurality of second meshes 31 or can be atomized into smaller water drops under the action of the centrifugal force, and collide strongly with the air passing through the second meshes 31, thereby further enlarging the air-liquid contact area. At the same time, the spread thin liquid film or the smaller water drops also have a more efficient capturing effect on the dust particles contained in the air, thus achieving improved dust removal. Furthermore, when the air passes through the first rotary disk 3, the rotation of the first rotary disk 3 can also drive the air to flow to provide power to the air that passes through the first rotary disk 3, so that purified air flows towards the air outlet 12.

The capture member is rotatably arranged downstream of the purifying assembly. The capture member includes a second rotary cylinder 6 and a second rotary disk 7. An outer circumferential wall of the second rotary cylinder 6 is a cylindrical surface. That is, the outer circumferential wall of the second rotary cylinder 6 is in the form of a closed wall surface, and an inside of the second rotary cylinder 6 does not communicate with an outside of the second rotary cylinder 6. For example, the second rotary cylinder 6 may be in the form of an airtight and watertight structure. The second rotary cylinder 6 is spaced apart from the side wall of the housing 1, so that the air may pass through a second interval space 61 between the second rotary cylinder 6 and the housing 1.

Specifically, the second rotary cylinder 6 is located downstream of the first rotary disk 3. The second interval space 61 is formed between the second rotary cylinder 6 and the housing 1. The second interval space 61 may be adapted to be passed by air. The air purified by the first rotary disk 3 may flow through the second interval space 61, and the centrifugal movement of the air flowing through the second interval space 6 may be enhanced by the second rotary cylinder 6 rotating at a high speed, which is favorable for throwing the water droplets entrained in the air to the inner wall surface of the housing 1, thereby facilitating the gas-liquid separation and improving the purification effect.

A portion of the second rotary disk 7, which is located between the second rotary cylinder 6 and the housing 1 at least in the radial direction, is provided with a third mesh 71. That is, at least a portion of the second rotary disk 7, which corresponds to the second interval space 61 in an axial direction of the second rotary disk 7, is provided with a plurality of third meshes 71. By means of the plurality of third meshes 71, further capture of the water droplets in the air and further purification of the air may be realized.

The second rotary disk 7 is connected downstream of the second rotary cylinder 6. The air purified by the first rotary disk 3 flows to the second rotary disk 7. When tiny water droplets in the air contact the second rotary disk 7, the water droplets may be spread into a thin liquid film or atomized into tiny water droplets on the second rotary disk 7 provided with the plurality of third meshes 71. The thin liquid film or atomized tiny water droplets collide strongly with the air passing through the third meshes 71, to further increase the gas-liquid contact area. At the same time, the spread thin liquid film or water droplets also have a more efficient capture effect on the dust particles contained in the air to further strengthen the dust removal. Furthermore, the second rotary disk 7 may also drive the air to continue to flow, thereby improving the fluidity.

In the purification device 100 for purifying air according to the embodiments of the disclosure, the first rotary cylinder 2 rotates at a high speed, so that the water injected from the water inlet pipe 4 into the first rotary cylinder 2 may be torn through the first mesh 21 to form water column, water droplet or water mist flowing into the first interval space 23. At the same time, the air entering the air inlet 11 flows through the first interval space 23. In this way, the water droplets in the first interval space 23 are mixed with the air flowing through the first interval space, and the water droplets may efficiently capture the dust particles in the air flowing through the first interval space 23, so that the dust particles and the like in the air may be removed to realize the air purification effect.

The air purified by the water droplets continues to flow upward, and the air contains a small amount of water droplets. The first rotary disk 3 may capture the remaining water droplets in the air, and may tear larger water droplets in the air into tiny water droplets, thereby facilitating the capture of dust in the air to realize further purification of the air. There will still be some tiny water droplets in the air passing through the first rotary disk 3. The capture member is arranged downstream of the purifying assembly. The capture member may further capture the water droplets in the air to enhance the gas-liquid separation effect. Thus, the capture member may reduce the water content in the air while improving the purification effect, thereby preventing the excessive water content in the air from affecting downstream components.

The purification device 100 of the disclosure may be applied to the field of household air purification. In the related art, most of household air purification devices 100 are internally provided with filtering devices, such as a High Efficiency Particulate Air Filter (HEPA). The purification device 100 of the disclosure may purify particulate pollutants above 1 μm and some gaseous pollutants. In this way, the load of a rear-mounted filtering device may be greatly reduced, and the water content in the air may also be reduced to prevent breeding of bacteria in the HEPA after being soaked by water, so that the service life and purification effect of the rear-mounted filtering device may be ensured, and cleaner air may be discharged from the air outlet 12.

In addition, in the related art, the purification device 100 is provided with a rotary disk below the purifying assembly to primarily purify the air. However, the purification device 100 of the disclosure does not need to provide a rotary disk below the purifying assembly, so that air does not need to pass through the rotary disk, thereby reducing the pressure loss and further facilitating the flow of the air.

In some embodiments of the disclosure, the water injection nozzles are formed on a side wall of the water inlet pipe 4 and are evenly distributed along each of the circumferential direction and radial direction of the water inlet pipe 4. Water may be evenly injected from the water inlet pipe 4 to the first rotary cylinder 2 through the plurality of water injection nozzles, to further facilitate the tearing of water and improve the purification effect. Of course, it can be understood that the water injection nozzles may also be unevenly distributed on the water inlet pipe 4, which may be set according to actual needs. Further, the position of each of the plurality of first meshes 21 on the first rotary cylinder 2 may correspond to the position of a respective one of the water injection nozzles on the water inlet pipe 4, so that the water injected from the water injection nozzles may be injected to the first meshes 21.

In some embodiments of the disclosure, the motor 5 is arranged above the capture member to drive the purifying assembly and the capture member to rotate synchronously. That is, the first rotary cylinder 2, the first rotary disk 3, the second rotary cylinder 6 and the second rotary disk 7 may be driven by the same motor 5, so that the structure of the purification device 100 may be simplified, and the purification device 100 has better consistency and higher stability. Furthermore, since a large amount of water vapor and dust particles participate in the working process of the purification device 100, by arranging the motor 5 above the second rotary disk 7, it is possible to prevent the motor 5 from being corroded by water vapor and being stacked by dust particles. It can be understood that when a plurality of capture members and purifying assemblies are provided, the plurality of purifying assemblies and capture members may also be driven by the same motor 5 or driven respectively by a plurality of motors 5, or each motor 5 may also drive at least one capture member and/or at least one purifying assembly into rotation, which is not limited in the disclosure.

In some embodiments of the disclosure, the water inflow end 41 of the water inlet pipe 4 is located at a lower part of the housing 1, and the water discharge end 42 is arranged at a position higher than the water inflow end 41. In this way, the water may be delivered from bottom to top along the water inlet pipe 4, and more water may be injected to the side wall of the first rotary cylinder 2 when the water is injected from the water discharge end 42, so that more water is dispersed into the first interval space 23, and the purification device 100 may better capture dust particles in the air to improve the purification effect of water on the air.

In some embodiments of the disclosure, the first rotary disk 3 is in the form of an annular disk, and an inner side wall of the annular disk is connected with an outer side wall of the first rotary cylinder 2. In other words, the first rotary disk 3 may be in the form of an annular shape, the first rotary disk 3 may be arranged on the outer side of the first rotary cylinder 2, and the inner side wall of the first rotary disk 3 is fixedly connected with the outer side wall of the first rotary cylinder 2, so that the assembly of the first rotary cylinder 2 and the first rotary disk 3 is realized, and the purification device 100 is simple in structure and convenient to assemble.

Optionally, the first rotary disk 3 may be integral with the first rotary cylinder 2, and the first rotary disk 3 is formed by an extension of an outer wall surface of the first rotary cylinder 2 extending outward along the radial direction, so that the structural stability and structural strength of the first rotary disk 3 and the first rotary cylinder 2 may be increased, and the working reliability of the purification device 100 may be ensured.

Figure 6:
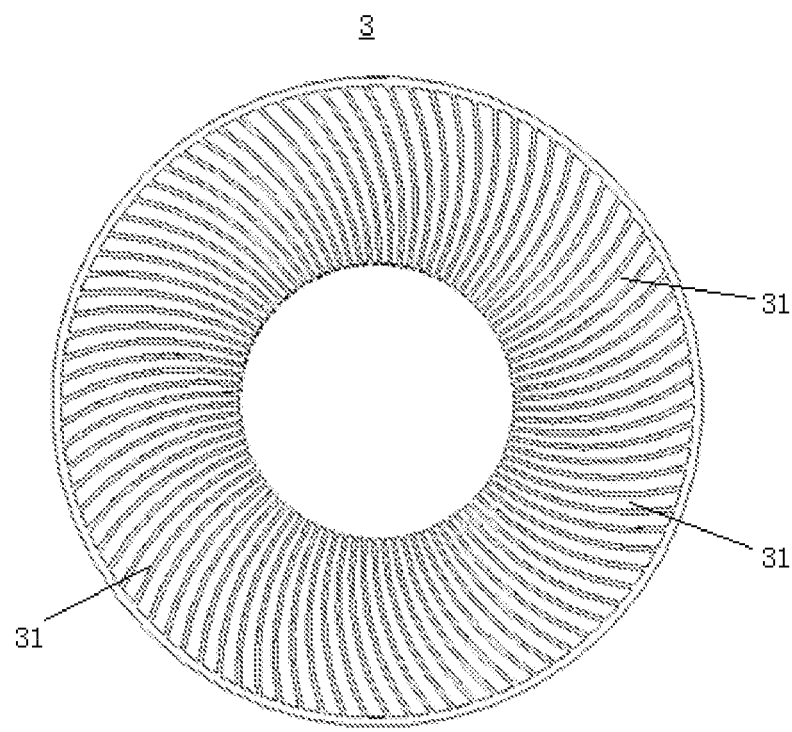
FIG. 6 is a schematic diagram of a first rotary disk of a purification device for purifying air according to an embodiment of the disclosure.
Figure 7:
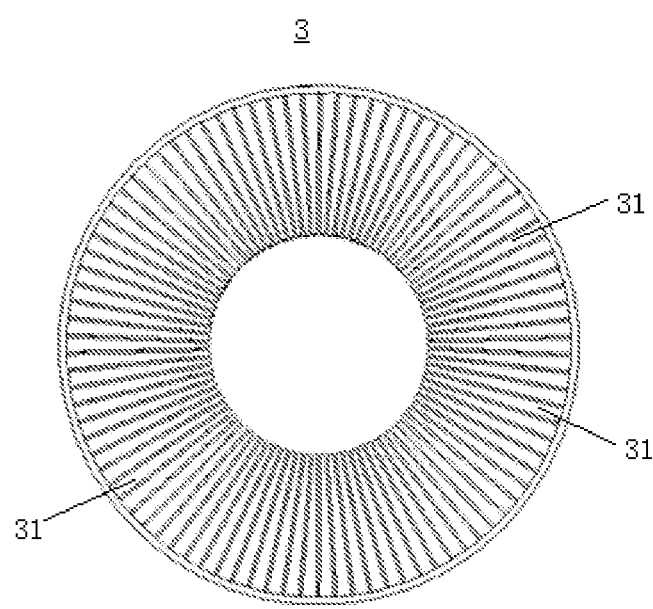
FIG. 7 is a schematic diagram of a first rotary disk of a purification device for purifying air according to another embodiment of the disclosure.

In some other embodiments of the disclosure, the first rotary disk 3 may be in the form of a circular disk. For example, the first rotary disk 3 may be in the form of a light and thin circular disk. The first rotary cylinder 2 may be in the form of a hollow structure with an open upper end, and the first rotary disk 3 closes the upper end of the first rotary cylinder 2. As shown in FIG. 6 and FIG. 7, a middle portion of the first rotary disk 3 is closed. Only a portion of the first rotary disk 3, which is located between the housing 1 and the second rotary cylinder 2, is provided with the second mesh 31. A top of the first rotary cylinder 2 is open, and the first rotary disk 3 is arranged above the first rotary cylinder 2 to close the top of the first rotary cylinder 2. The first rotary disk 3 may be fixedly connected with the first rotary cylinder 2 through rivets, or may be installed above the first rotary cylinder 2 in a welding manner or other manners, which is not limited in the disclosure.

Regarding the structure of the first rotary disk 3 and the second rotary disk 5, each of the first rotary disk 3 and the second rotary disk 5 may be in the form of a wire mesh structure. In this way, the first rotary disk 3 and the second rotary disk 5 are simple in structure and easy to produce and assemble, solid particles and the like contained in the air may also be separated from the air. Furthermore, the second meshes 31 and third meshes 71 are more evenly distributed, which is beneficial to the capture of droplets and the passage of air. Of course, it can be understood that the first rotary disk 3 and the second rotary disk 5 may also be in the form of other structures, such as a spoke structure and a profiled turntable structure shown in FIG. 6 and FIG. 7, which are not limited in the disclosure.

Regarding the distribution of the second mesh 31 and the third mesh 71, the second meshes 31 may be evenly distributed on the first rotary disk 3 or may be unevenly distributed on the first rotary disk 3, and the third meshes 71 may be evenly distributed on the second rotary disk 7 or may be unevenly distributed the second rotary disk 7, which are not limited in the disclosure. The distribution of the second mesh 31 and the third mesh 71 may be determined according to actual conditions. Regarding the shape of the second mesh 31 and the shape of the third mesh 71, the second mesh 31 and the third mesh 71 may be in the form of circular mesh or other mesh with regular or irregular shape.

In an example shown in FIG. 6, the second mesh 31 may be of a strip shape, and a plurality of meshes are scattered and spaced apart from each other along the circumferential direction of the rotary disk. In an example shown in FIG. 7, the second mesh 31 may be of an arc shape, and a plurality of second meshes 31 have the same arc angle and are evenly distributed along the circumferential direction of the first rotary disk 3.

In some examples of the disclosure, the second rotary disk 7 may also be in the form of a circular disk. Third meshes 71 may be evenly distributed on the second rotary disk 7. Optionally, the second rotary disk 7 may also be partially provided with the third mesh 71. For example, the third mesh 71 is only arranged on a portion of the second rotary disk 7, which is located between the second rotary cylinder 6 and the housing 1.

Figure 3:
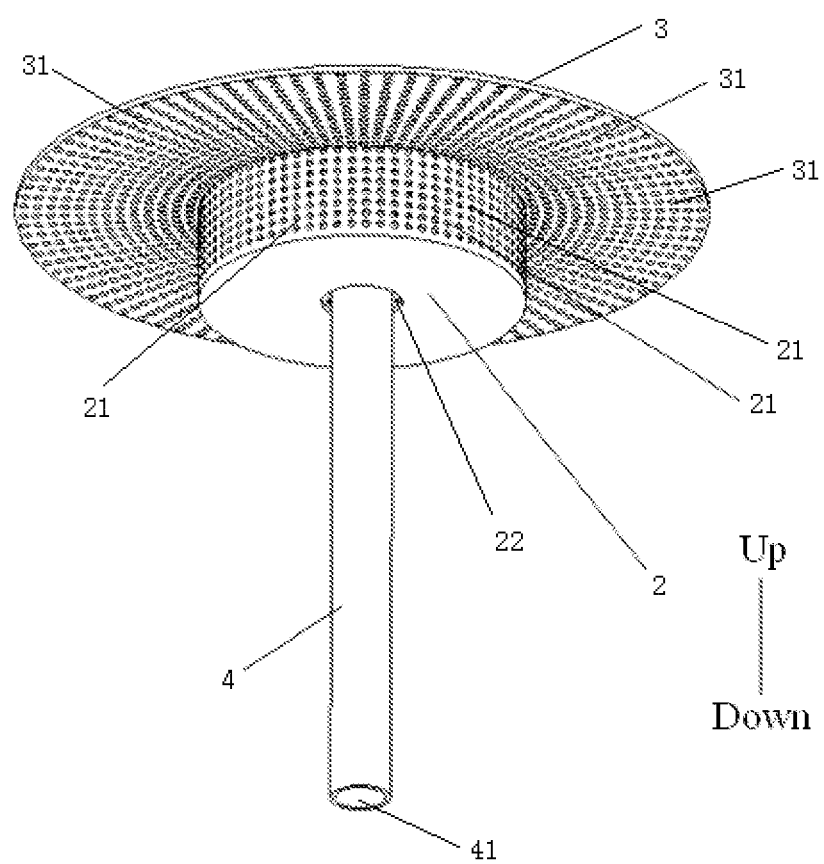
FIG. 3 is a schematic diagram of a first rotary cylinder, a first rotary disk and a water inlet pipe of a purification device for purifying air according to an embodiment of the disclosure.

In some embodiments of the disclosure, each of an upper and a lower end of the first rotary cylinder 2 is formed as a closed structure. That is, each of a top and a bottom of the first rotary cylinder 2 is closed, to prevent water from leaking from the first rotary cylinder 2 to cause corrosion to other components, and also prevent air from leaving from the top of the first rotary cylinder 2 without passing through the first rotary disk 3. As shown in FIG. 3, the bottom wall of the first rotary cylinder 2 is provided with an opening 22 adapted to be passed by the water inlet pipe 4. The water discharge end 42 of the water inlet pipe 4 extends into the first rotary cylinder 2 through the opening 22. A dimension of the opening 22 may be slightly larger than a dimension of the water inlet pipe 4, thereby facilitating the rotation of the first rotary cylinder 2 relative to the water inlet pipe 4, and also facilitating the assembly of the water inlet pipe 4 and the opening 22.

In some embodiments of the disclosure, the purification device 100 for purifying air may also include a water pan. The water pan is arranged at a bottom of the housing 1, and the water inflow end 41 is located in the water pan, so that the water after purifying air may be collected through the water pan.

Specifically, larger water droplets in the air rotate at a high speed and are thrown to the inner side wall of the housing 1, and the water droplets may flow downward along the inner side wall of the housing 1 and flow to the water pan. The water in the water pan may serve as a water source of the water inlet pipe 4. That is, the water inlet pipe 4 may inject the water in the water pan to a water purifying assembly, thereby realizing the recycling of water resources. Moreover, it is not necessary for a user to frequently add water to the purification device 100, thereby improving the convenience of the purification device 100 and also saving water resources. Of course, it can be understood that the user may periodically replace the water in the water pan, thereby further ensuring the air purification effect of the purification device 100.

The water pan may be provided with a drain opening, and the water in the water pan may be discharged through the drain opening. Or the water pan is detachably arranged in the housing 1, therefore, the user may directly take out the water pan and then pour out the water. The disclosure is not limited to this.

Figure 2:
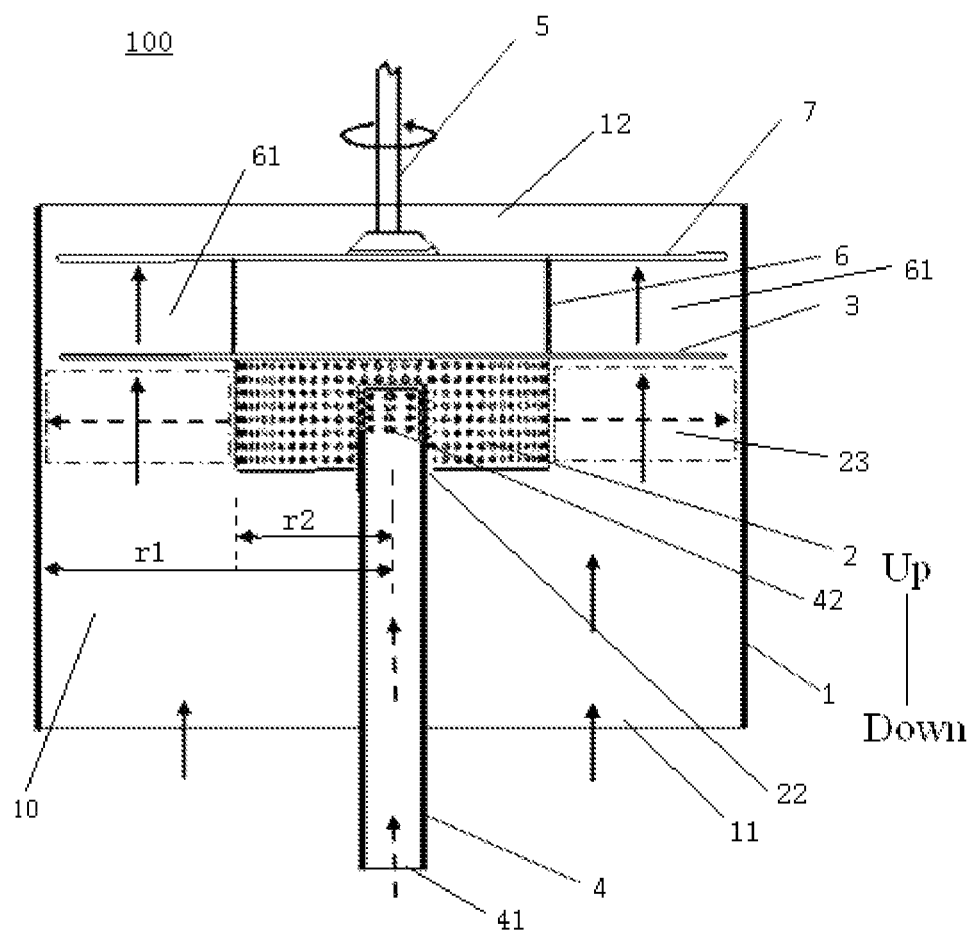
FIG. 2 is a sectional view along a line A-A in FIG. 1.

In some embodiments of the disclosure, as shown in FIG. 2, the housing 1 is in the form of a cylinder. A radius of the housing 1 is r1, and a radius of the first rotary cylinder 2 is r2, wherein r1 and r2 meet: $0.2r1 < r2 < 0.7r1$. In other words, the radius of the first rotary cylinder 2 is 0.2 times greater than the radius of the housing 1 and 0.7 times less than the radius of the housing 1, so that the rotation speed of the first rotary cylinder 2 may be ensured, the purification effect may be improved, and the pressure loss may also be reduced. Specifically, if the dimension of the r2 is too small, the speed of a drum body of the first rotary cylinder 2 driven at the same rotation speed is not large enough, and if the dimension of the r2 is too large, a circulation area of the first interval space 23 that allows air to pass through is too small, thereby causing a larger pressure loss. Preferably, an axial height of the first rotary cylinder 2 is h, wherein r1 and h meet: $0.1r1 < h < 0.8r1$, so that the purification performance of the purifying assembly may be further optimized.

In some embodiments of the disclosure, the side wall of the first rotary cylinder 2 is in the form of a wire mesh structure having 20 to 100 meshes. When the water entering the first rotary cylinder 2 passes through the wire mesh structure, the wire mesh structure may easily tear the water to be the form of water droplets, water columns or water mist, thereby improving the water tearing effect of the first rotary cylinder 2. Regarding the material of the first rotary cylinder 2, the material of the first rotary cylinder 2 may be stainless steel, copper, plastic, and the like. The first rotary cylinder 2 is provided with a plurality of first meshes 21. The first mesh 21 may be the form of a circular opening structure shown in FIG. 2, or may be the form of other opening structures such as a triangle and a hexagon, or may be the form of opening structures with different dimensions and shapes.

In some embodiments of the disclosure, a porosity of the side wall of the first rotary cylinder 2 is 0.3 to 0.7. The porosity refers to a ratio of the opening area of the side wall of the first rotary cylinder 2 to the total area of the side wall of the first rotary cylinder 2. In other words, the ratio of the total opening area of a plurality of first meshes 21 to the total area of the side wall of the first rotary cylinder 2 is 0.3 to 0.7, thereby further improving the purification effect of the purifying assembly. Specifically, if the porosity is too low, it is difficult for water to pass through, and it is easy to cause water to accumulate on the inner wall of the first rotary cylinder 2. As a result, the distribution of water after passing is uneven, some places are sparse and some places are dense, and some are clustered and injected out. If the porosity is too high, the water will pass through too easily, the particle size of the water droplets after tearing is relatively large, and the ratio of the area to volume of the water droplets is relatively small, thereby affecting the air purification efficiency.

Figure 5:
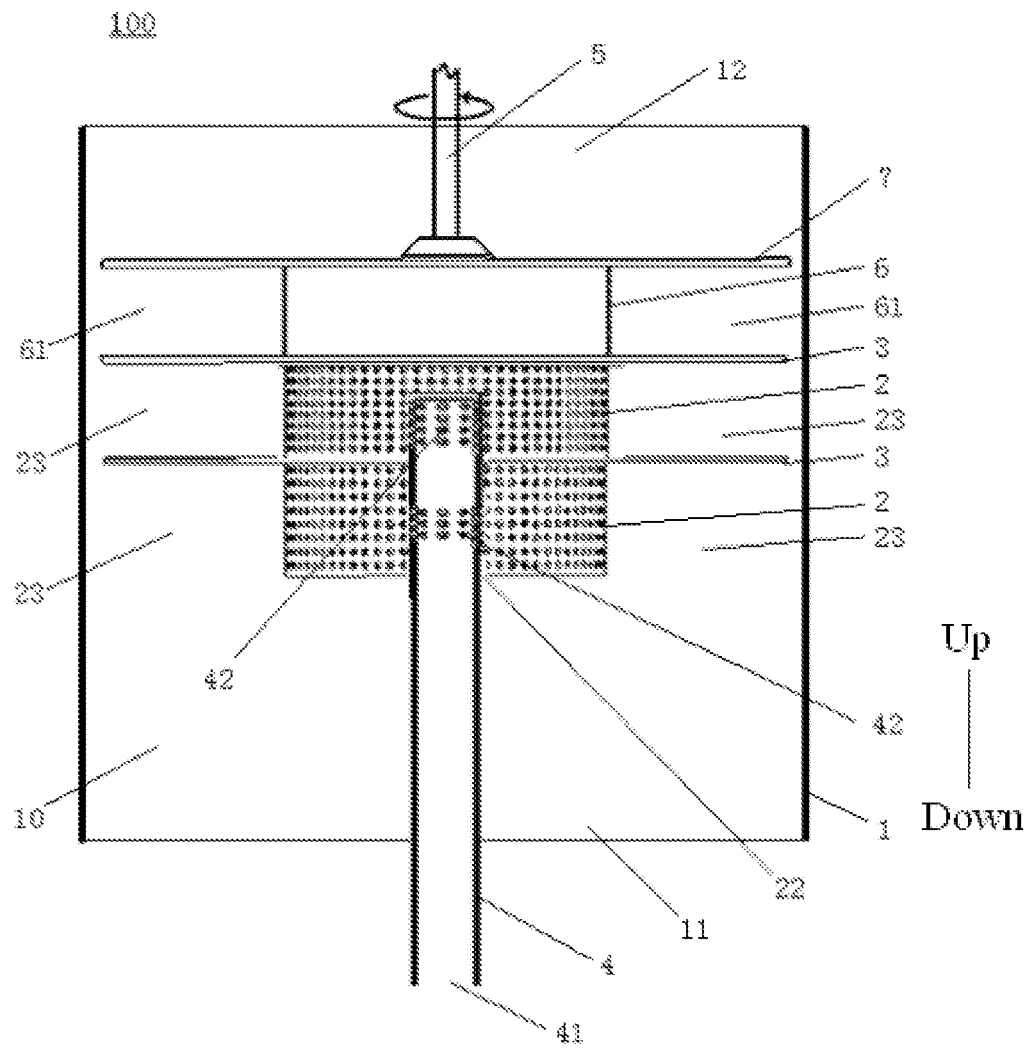
FIG. 5 is a sectional view of a purification device for purifying air according to a further embodiment of the disclosure.

In some embodiments of the disclosure, as shown in FIG. 5, the air outlet 12 is arranged at a position higher than the air inlet 11. The purification device for purifying air includes a plurality of purifying assemblies which are sequentially stacked in an up and down direction. That is, the plurality of purifying assemblies may be coaxially arranged and are located between the air outlet 12 and the air inlet 11. Specifically, a plurality of first rotary cylinders 2 and first rotary disks 3 may be arranged and alternately arranged in sequence, so that air may pass through the plurality of purifying assemblies in sequence to realize multi-stage purification of the air to improve the purification effect.

The capture member is arranged at an upper end of an uppermost purifying assembly of the plurality of purifying assemblies. In other words, the capture member is arranged between the plurality of purifying assemblies and the air outlet 12, so that the air may continue to flow to the capture member after being purified by the plurality of purifying assemblies. The capture member may capture the droplets carried in the air purified by the plurality of purifying assemblies, so that the cleaner air with lower water content flows to the air outlet 12.

Figure 4:
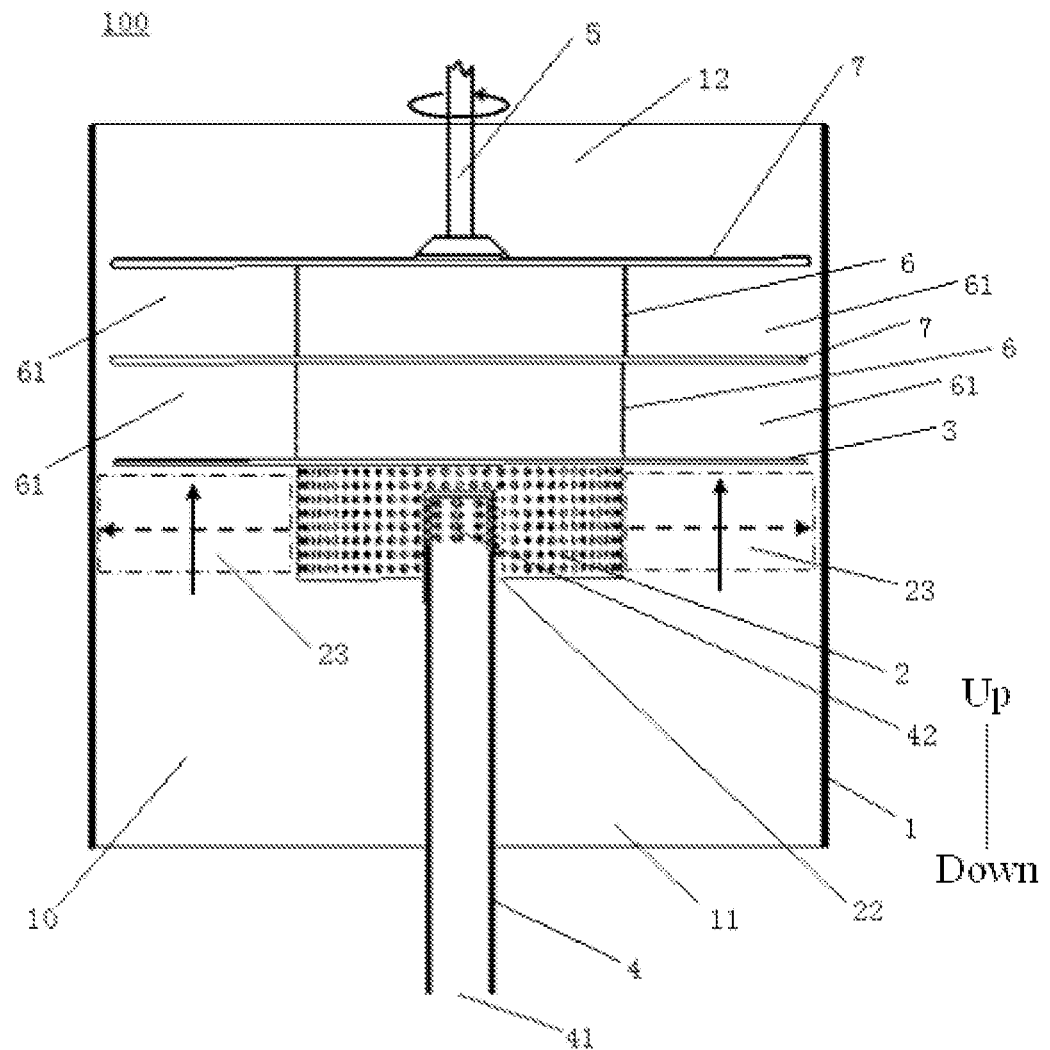
FIG. 4 is a sectional view of a purification device for purifying air according to another embodiment of the disclosure.

In some embodiments of the disclosure, as shown in FIG. 4, the purification device for purifying air includes a plurality of capture members which are sequentially stacked in the up and down direction. Each of the plurality of capture members is located above the plurality of purifying assemblies. In other words, the purification device for purifying air includes a plurality of purifying assemblies and a plurality of capture members which are coaxially arranged, and the air may flow through the plurality of purifying assemblies in sequence and then flow to the plurality of capture members, thereby realizing multi-stage purification and multi-stage capture.

In some examples of the disclosure, the purification device for purifying air may also include only one purifying assembly. A plurality of capture members are sequentially stacked above the purifying assembly. In this way, the air flows through the purifying assembly and then flows to the plurality of capture members. The plurality of capture members may perform multi-stage capture on the droplets carried in the air, so that the cleaner air with lower water content flows to the air outlet 12.

In an example shown in FIG. 4, the purification device for purifying air includes two capture members and one purifying assembly. The two capture members are arranged above the purifying assembly and are sequentially stacked in the up and down direction. In this way, the air may flow to the capture members after one-stage purification, and then flow to the air outlet 12 after two-stage capture by the two capture members.

In some other embodiments of the disclosure, the air outlet 12 is arranged at a position higher than the air inlet 11. The purification device for purifying air includes a plurality of purifying assemblies and a plurality of capture members which are stacked onto one another in the up and down direction. That is, the purification device for purifying air may include a plurality of capture members and a plurality of purifying assemblies which may be coaxially arranged. By means of the plurality of capture members and the plurality of purifying assemblies, the purification effect of the air may be enhanced, and the retention effect of water droplets in the air may be improved.

Specifically, there may be multiple sequences in which the plurality of capture members and the plurality of purifying assemblies are stacked onto one another in the up and down direction. For example, the plurality of capture members and the plurality of purifying assemblies may be alternately arranged in the up and down direction, so that the air passes through a capture member after passing through one purifying assembly. That is, after the air is purified through a purifying assembly, the air may pass through a capture member to capture the water droplets contained in the air. By adopting the plurality of capture members and the plurality of purifying assemblies to repeatedly purify the air and repeatedly capture the water droplets in the air, the air purification effect of the purification device 100 may be enhanced, and cleaner air flows to the air outlet 12.

In some other examples of the disclosure, two or more capture members may be arranged between adjacent purifying assemblies, or two or more purifying assemblies may be arranged between adjacent capture members. In this way, the air may be purified by multiple stages to capture water droplets through one-stage capture member, or may be purified by one stage to capture water droplets many times through multiple stages of capture members. There may be multiple sequences in which the purifying assemblies and the capture members are stacked onto another in the up and down direction. Specifically, the sequences may be set according to actual conditions and are not specially limited in the disclosure.

At least one of the plurality of capture members is located at a position closest to the air outlet 12. In other words, in the flow direction of air, at least one of the plurality of capture members is located on the most downstream side, to ensure that the air passes through at least one capture member, so that the air needs to pass through at least one capture member to capture the water droplets contained in the air before flowing to the air outlet 12. In this way, after the capture member captures the water droplets in the air, the clean air with low water content flows to the air outlet 12, so that further purification of the air may be realized, and downstream parts may be prevented from being corroded by water vapor to prolong the service life of the downstream parts.

In some embodiments of the disclosure, the water inlet pipe 4 passes through the plurality of purifying assemblies, and the water inlet pipe 4 is provided with water injection nozzles corresponding to the first rotary cylinder 2 of each of the plurality of purifying assemblies. Specifically, as shown in FIG. 5, the water inlet pipe 4 may include multiple sections, and each section of the water inlet pipe 4 is provided with a plurality of water injection nozzles corresponding to the first rotary cylinder 2 of one of the plurality of purifying assemblies. That is, each section of the water inlet pipe 4 corresponds to the respective first rotary cylinder 2, and each section of the water inlet pipe 4 is provided with a plurality of water injection nozzles distributed along the circumferential direction of the water inlet pipe 4. The water entering the water inlet pipe 4 may be injected into the corresponding first rotary cylinder 2 through the water injection nozzles. Thus, by arranging one water inlet pipe 4, water may be injected into a plurality of first rotary cylinders 2. The structure is simple and easy to assemble. The first rotary cylinder 2 rotates at a high speed to tear water, and the water flows to the first interval space 23 after being torn by a plurality of first meshes 21.

Of course, the purification device for purifying air may include a plurality of water inlet pipes 4, and the water discharge end 42 of each of the plurality of water inlet pipes 4 extends into the first rotary cylinder 2 of a corresponding purifying assembly of the plurality of purifying assemblies. In other words, each of the plurality of water inlet pipes 4 may correspond to a respective one of the plurality of purifying assemblies. The water discharge end 42 of each water inlet pipe 4 extends into the corresponding first rotary cylinder 2, thereby being favorable for injecting water into the first rotary cylinder 2 through the water inlet pipe 4. Furthermore, by arranging the plurality of water inlet pipes 4, the water injecting uniformity of the first rotary cylinder 2 may also be ensured.

In an example shown in FIG. 5, the purification device for purifying air 100 includes two purifying assemblies and one capture member. The capture member is arranged at the most downstream side, the two purifying assemblies are located below the capture member and are coaxial with the capture member. The water inlet pipe 4 passes through the two purifying assemblies in sequence to inject water to each of the two purifying assemblies.

The disclosure further provides an air purifier provided with the purification device 100 for purifying air in the above embodiments.

In the air purifier according to the embodiments of the disclosure, by arranging the purification device 100 for purifying air in the above embodiments, the purification effect may be improved, and the air purified by the air purifier is cleaner.

Other configurations and operations of the air purifier according to the embodiments of the disclosure are known to those of ordinary skill in the art, and will not be described in detail here.

In the description of this specification, the description referring to the terms "some embodiments", "some examples", or "optionally" means that the specific features, structures, materials, or characteristics described in combination with the present embodiment or example are included in at least one of the embodiments or examples of the disclosure. In this specification, the schematic representation of the above terms does not necessarily refer to the same embodiment or example. Moreover, the described specific features, structures, materials, or characteristics may be combined in any suitable manner in any one or more embodiments or examples.

Although the embodiments of the disclosure have been shown and described, those of ordinary skill in the art may understand that various changes, modifications, replacements and variations can be made to these embodiments without departing from the principles and objectives of the disclosure, and the scope of the disclosure is defined by the claims and equivalents thereof.

What is claimed is:

1. A purification device for purifying air, comprising:
   a housing provided with an air inlet and an air outlet, wherein a cavity communicating with the air inlet and the air outlet is defined in the housing;
   one or more purifying assemblies each rotatably arranged in the cavity and located between the air inlet and the air outlet, wherein a respective purifying assembly of the one or more purifying assemblies comprises a first rotary cylinder and a first rotary disk, the first rotary cylinder is spaced apart from a side wall of the housing, a side wall of the first rotary cylinder is provided with a first mesh in a circumferential direction of the side wall of the first rotary cylinder, the first rotary disk is connected downstream of the first rotary cylinder, and a portion of the first rotary disk, which is located between the first rotary cylinder and the housing in a radial direction, is provided with a second mesh;
   one or more water inlet pipes each comprising a water inflow end and a water discharge end, the water discharge end being provided with a plurality of circumferentially distributed water injection nozzles, and the water discharge end extending into the first rotary cylinder;
   one or more capture members each rotatably arranged downstream of the purifying assembly, wherein a respective capture member of the one or more capture members comprises a second rotary cylinder and a second rotary disk, an outer circumferential wall of the second rotary cylinder is a cylindrical surface, the second rotary cylinder is spaced apart from the side wall of the housing, the second rotary disk is connected downstream of the second rotary cylinder, and a portion of the second rotary disk, which is located between the second rotary cylinder and the housing at least in the radial direction, is provided with a third mesh; and
   a motor configured to drive the one or more purifying assemblies and the one or more capture members into rotation.

2. The purification device for purifying air of claim 1, wherein the motor is arranged above the one or more capture members to drive the one or more purifying assemblies and the one or more capture members to rotate synchronously.

3. The purification device for purifying air of claim 1, wherein the water inflow end of each of the one or more water inlet pipes is located at a lower part of the housing, and the water discharge end is arranged at a position higher than the water inflow end.

4. The purification device for purifying air of claim 1, wherein the first rotary disk is in a form of an annular disk, and an inner side wall of the annular disk is connected with an outer side wall of the first rotary cylinder.

5. The purification device for purifying air of claim 1, wherein the first rotary disk is in a form of a circular disk, the first rotary cylinder is in a form of a hollow structure with an open upper end, and the first rotary disk closes an upper end of the first rotary cylinder.

6. The purification device for purifying air of claim 1, wherein each of an upper end and a lower end of the first rotary cylinder is formed as a closed structure, and a bottom wall of the first rotary cylinder is provided with an opening adapted to be passed by the one or more water inlet pipes.

7. The purification device for purifying air of claim 1, further comprising a water pan, wherein the water pan is arranged at a bottom of the housing, and the water inflow end is located in the water pan.

8. The purification device for purifying air of claim 1, wherein the housing is in a form of a cylinder, and a radius of the first rotary cylinder is 0.2 to 0.7 times a radius of the housing.

9. The purification device for purifying air of claim 8, wherein an axial height of the first rotary cylinder is 0.1 to 0.8 times the radius of the housing.

10. The purification device for purifying air of claim 1, wherein the side wall of the first rotary cylinder is in a form of a wire mesh structure having 20 to 100 meshes.

11. The purification device for purifying air of claim 1, wherein a porosity of the side wall of the first rotary cylinder is 0.3 to 0.7.

12. The purification device for purifying air of claim 1, wherein the air outlet is arranged at a position higher than the air inlet, the one or more purifying assemblies are sequentially stacked in an up and down direction, and the one or more capture members are arranged at an upper end of an uppermost purifying assembly of the one or more purifying assemblies.

13. The purification device for purifying air of claim 12, wherein the one or more capture members are sequentially stacked in the up and down direction, and each of the one or more capture members is arranged above the one or more purifying assemblies.

14. The purification device for purifying air of claim 1, wherein the air outlet is arranged at a position higher than the air inlet, the one or more capture members and the one or more purifying assemblies are stacked onto one another in the up and down direction, and at least one of the one or more capture members is located at a position closest to the air outlet.

15. The purification device for purifying air of claim 12, wherein the one or more water inlet pipes pass through the one or more purifying assemblies, and each of the one or more water inlet pipes is provided with a water injection nozzle corresponding to the first rotary cylinder of each of the one or more purifying assemblies.

16. The purification device for purifying air of claim 12, wherein the water discharge end of each of the one or more water inlet pipes extends into the first rotary cylinder of a corresponding purifying assembly of the one or more purifying assemblies.

17. An air purifier comprising a purification device for purifying air, wherein the purification device for purifying air comprises:
   a housing provided with an air inlet and an air outlet, wherein a cavity communicating with the air inlet and the air outlet is defined in the housing;
   one or more purifying assemblies each rotatably arranged in the cavity and located between the air inlet and the air outlet, wherein a respective purifying assembly of the one or more purifying assemblies comprises a first rotary cylinder and a first rotary disk, the first rotary cylinder is spaced apart from a side wall of the housing, a side wall of the first rotary cylinder is provided with a first mesh in a circumferential direction of the side wall of the first rotary cylinder, the first rotary disk is connected downstream of the first rotary cylinder, and a portion of the first rotary disk, which is located between the first rotary cylinder and the housing in a radial direction, is provided with a second mesh;

one or more water inlet pipes each comprising a water inflow end and a water discharge end, the water discharge end being provided with a plurality of circumferentially distributed water injection nozzles, and the water discharge end extending into the first rotary cylinder;

one or more capture members each rotatably arranged downstream of the purifying assembly, wherein a respective capture member of the one or more capture members comprises a second rotary cylinder and a second rotary disk, an outer circumferential wall of the second rotary cylinder is a cylindrical surface, the second rotary cylinder is spaced apart from the side wall of the housing, the second rotary disk is connected downstream of the second rotary cylinder, and a portion of the second rotary disk, which is located between the second rotary cylinder and the housing at least in the radial direction, is provided with a third mesh; and a motor configured to drive the one or more purifying assemblies and the one or more capture members into rotation.

18. The air purifier of claim 17, wherein the motor is arranged above the one or more capture members to drive the one or more purifying assemblies and the one or more capture members to rotate synchronously.

19. The air purifier of claim 17, wherein the water inflow end of each of the one or more water inlet pipes is located at a lower part of the housing, and the water discharge end is arranged at a position higher than the water inflow end.

20. The air purifier of claim 17, wherein the first rotary disk is in a form of an annular disk, and an inner side wall of the annular disk is connected with an outer side wall of the first rotary cylinder.

* * * * *